US011500524B2

(12) United States Patent
Ayzenshtat et al.

(10) Patent No.: US 11,500,524 B2
(45) Date of Patent: *Nov. 15, 2022

(54) AUTOMATIC GENERATION OF PREFERRED VIEWS FOR PERSONAL CONTENT COLLECTIONS

(71) Applicant: EVERNOTE CORPORATION, Redwood City, CA (US)

(72) Inventors: Mark Ayzenshtat, San Mateo, CA (US); Clinton Burford, San Mateo, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 16/773,890

(22) Filed: Jan. 27, 2020

(65) Prior Publication Data

US 2020/0159379 A1    May 21, 2020

Related U.S. Application Data

(63) Continuation of application No. 14/470,021, filed on Aug. 27, 2014, now Pat. No. 10,545,638.
(Continued)

(51) Int. Cl.
*G06F 3/0482* (2013.01)
*G06F 3/0484* (2022.01)
(Continued)

(52) U.S. Cl.
CPC .......... *G06F 3/0484* (2013.01); *G06F 3/0482* (2013.01); *G06N 20/00* (2019.01); *G06N 20/10* (2019.01)

(58) Field of Classification Search
None
See application file for complete search history.

(56) References Cited

U.S. PATENT DOCUMENTS

| 7,161,619 B1 | 1/2007 | Niida et al. |
| 7,354,377 B2 | 4/2008 | Beaumont et al. |

(Continued)

OTHER PUBLICATIONS

Ayzenshtat, Office Action, U.S. Appl. No. 14/470,021, dated Nov. 23, 2016, 25 pgs.
(Continued)

*Primary Examiner* — Rinna Yi
(74) *Attorney, Agent, or Firm* — Morgan, Lewis & Bockius LLP

(57) ABSTRACT

A computer system obtains access to a content collection that includes a plurality of content items. For each of the content items, the computer system determines user access history and context associated with the access history. The system builds a classifier characterizing a user access pattern of the content items. The system constantly monitors in real-time environmental parameters of the user. It infers a current context of the user based on the environmental parameters. In accordance with the current context, for each of the content items, the system extracts numeric feature values, evaluates the item using the classifier, and determines a score for the item. The system identifies in real-time a subset of the content items that is most relevant to the current context. The system further generates a preferred view of the subset and causes the preferred view to be delivered to a mobile device.

18 Claims, 5 Drawing Sheets

Related U.S. Application Data

(60) Provisional application No. 61/878,296, filed on Sep. 16, 2013.

(51) Int. Cl.
*G06N 20/00* (2019.01)
*G06N 20/10* (2019.01)

(56) References Cited

U.S. PATENT DOCUMENTS

| | | | |
|---|---|---|---|
| 7,796,309 | B2 | 9/2010 | Sadovsky et al. |
| 8,453,044 | B2 | 5/2013 | Markus et al. |
| 9,430,131 | B1* | 8/2016 | Zhang ............... G06F 3/04842 |
| 2002/0135614 | A1 | 9/2002 | Bennett et al. |
| 2004/0205347 | A1 | 10/2004 | Erol et al. |
| 2005/0273372 | A1 | 12/2005 | Bowne et al. |
| 2006/0009987 | A1 | 1/2006 | Wang |
| 2007/0016661 | A1 | 1/2007 | Malik |
| 2007/0067420 | A1* | 3/2007 | Yamaguchi ........... A63F 13/216 709/219 |
| 2007/0070940 | A1 | 3/2007 | Vander Veen et al. |
| 2008/0300937 | A1 | 12/2008 | Allen et al. |
| 2009/0013250 | A1 | 1/2009 | Hsieh et al. |
| 2009/0164416 | A1 | 6/2009 | Guha |
| 2010/0036782 | A1 | 2/2010 | Zhao et al. |
| 2010/0141393 | A1 | 6/2010 | Daniel |
| 2010/0142807 | A1 | 6/2010 | Yasuda et al. |
| 2010/0306018 | A1 | 12/2010 | Burtner et al. |
| 2011/0279350 | A1 | 11/2011 | Hutchinson et al. |
| 2011/0282964 | A1* | 11/2011 | Krishnaswamy ...... G06Q 30/02 709/217 |
| 2012/0221963 | A1 | 8/2012 | Motoyama |
| 2013/0036117 | A1 | 2/2013 | Fisher et al. |
| 2013/0073329 | A1 | 3/2013 | Shoham et al. |
| 2013/0086487 | A1 | 4/2013 | Findlay et al. |
| 2013/0093829 | A1 | 4/2013 | Rosenblatt et al. |
| 2013/0222257 | A1 | 8/2013 | Kwon |
| 2013/0238731 | A1 | 9/2013 | Sato |
| 2014/0108506 | A1 | 4/2014 | Borzyeki et al. |
| 2014/0188541 | A1 | 7/2014 | Goldsmith et al. |

OTHER PUBLICATIONS

Ayzenshtat, Final Office Action, U.S. Appl. No. 14/470,021, dated Jul. 13, 2017, 12 pgs.
Ayzenshtat, Office Action, U.S. Appl. No. 14/470,021, dated Jun. 20, 2018, 37 pgs.

* cited by examiner

AUTOMATIC GENERATION OF PREFERRED VIEWS FOR PERSONAL CONTENT COLLECTIONS

CROSS-REFERENCE TO RELATED APPLICATIONS

This application is a continuation of U.S. patent application Ser. No. 14/470,021, filed Aug. 27, 2014, titled "AUTOMATIC GENERATION OF PREFERRED VIEWS FOR PERSONAL CONTENT COLLECTIONS," which claims priority to U.S. Provisional Application No. 61/878,296, filed Sep. 16, 2013, titled "AUTOMATIC GENERATION OF PREFERRED VIEWS FOR PERSONAL CONTENT COLLECTIONS", all of which are hereby incorporated by reference herein in their entirety.

TECHNICAL FIELD

This application is directed to the field of extracting, analyzing and presenting information, especially in conjunction with custom ordering of items in personal and shared content management systems.

BACKGROUND OF THE INVENTION

Hundreds of millions people are using personal, shared and business-wide content management systems, such as the Evernote service and software created by the Evernote Corporation of Redwood City, Calif., the Microsoft® Office OneNote and many more systems. Content collections supported by such software and online services may contain thousands and even hundreds of thousands of content items (notes, memos, documents, etc.) with widely varying sizes, content types and other parameters. These items are viewed and modified by users in different order, with different frequency and under different circumstances. Routines for accessing items in content collections may include direct scrolling, keyword and natural language search, accessing items by tags, categories, notebooks, browsing interlinked clusters of items with or without indexes and tables of content, and other methods.

Irrespective of specific methods, quick and targeted access to desired content at any given moment, place and situation is important to user productivity and convenience. Search technologies, organizational and user interface features, such as tags, favorites, folders, advanced content sorting, and other functionality provide a significant help in accessing needed content. Contemporary content management systems may expand search to images, audio and video, synonyms, semantic terms, anthologies and language specifics. Navigational methods for tags, tag clouds, lists of favorites, and interlinked clusters of items are constantly progressing and may include multi-dimensional and dynamic data representation, advanced use of touch interfaces and screen estate, etc.

Still, even the most sophisticated search and navigational methods may be insufficient for quickly growing information volumes. Additionally, repetitive searches for the same materials even with saved queries take additional time with every search occurrence. A recent enterprise search study has discovered a significant search gap affecting all categories of workers: 52% of respondents said they could not find the information they were seeking within an acceptable amount of time using their own organization's enterprise search facility. Further analysis has shown that 65% of respondents have defined an overall good search experience as a situation where a particular search takes less than two minutes. However, only 48% of study participants have reported being able to achieve that result in their own organization. In other words, there exists a 17% gap between user expectation of satisfying search experiences and an enterprise search reality. Additionally, about 90% of respondents reported that taking four minutes or more to find the information they want does not constitute a good search experience; yet 27% responded this was the case within their own enterprises. Accordingly limited search efficiency may drive many users to abandoning search as a method of defining immediate views of materials from personal or shared data collections. Analogously, sorting items in a content collection by time, location, size and other parameters may complicate information processing and still fall short of representing content views required by users.

Furthermore, user needs in accessing various materials from content collections (notes, attachments, notebooks, folders, etc.) are driven, on the one hand, by constantly changing work, home and other environments, and on the other hand, by repetitive patterns of user adaptation to such environments. For example, users may need several notes with standard bits of information (a social security number, a driver license number, a passport number or other IDs, a credit card number) every time they visit an official establishment. However, additional pieces of information that they may need could significantly differ depending on whether the users visit a bank or a medical office, are traveling to a place where they have taken family photos and want to recall them or are reviewing materials before a weekly staff meeting. Reflecting dynamic combinations of parameters, different environments and contexts influencing content access requirements and customized content views may be difficult with fixed content settings such as tags or favorite lists, while trying to memorize such combinations of parameters may be cumbersome, tiring, and inefficient and causing frequent updates as user behavior patterns evolve.

Accordingly, it is desirable to develop advanced systems and methods for generating preferred content views depending on context and user viewing history.

SUMMARY OF THE INVENTION

According to the system described herein, providing a view of relevant items of a content collection includes identifying a current context based temporal parameters, spatial parameters, navigational parameters, lexical parameters, organizational parameters, and/or events, evaluating each of the items of the content collection according to the current context to provide a value for each of the items, and displaying a subset of the items corresponding to highest determined values. The temporal parameters may include a time of recent access of an item, frequency of access of an item, frequency of location related access of an item, and frequency of event related access of an item. Frequency of access of an item may be modeled according to the following formula:

$$f^u(e) = \Sigma_{c_j \in C^e} 2^{-t(c_j)/t_m} / \Sigma_{c_j \in C} 2^{-t(c_j)/t_m}$$

where $f^u(.)$ is a feature value for frequency, e is an accessed content item, $c_i(c_j), C, C^e$ are, respectively, past user actions and a set of all actions and only past actions where the user has accessed the item $e, t(c_i)(t(C_j))$ is an age of each access event measured at a present moment, and $t_m$ is a normalizing median coefficient. Temporal patterns of accessing items may be numerically assessed based on time of day, time of week, and/or time of month. Evaluating each item may include determining a distance from a separating hyperplane using a support vector machine classification method. User feedback may be used to adjust subsequent evaluation of each of the items. The user feedback may be implicit and may include frequency of actual viewing by the user. The user feedback may be explicit. User feedback may be used to modify features used to evaluate items. The subset of items may include only items having a value above a predetermined threshold and displaying the subset of items may include sorting the subset according to values provided for each of the items and items that are not part of the subset may be displayed following items in the subset. Displaying the subset of items may include displaying the items in a pop up screen that is superimposed over a different list containing the items. Analyzing items may include splitting the items into a training set and a test set and a classifier may be built using automatic learning. Prior to evaluating the items, the items in the training set may be analyzed to develop a set of rules used for evaluation of the items. The temporal parameters of the items in the training set may include a time of recent access of an item, frequency of access of an item, frequency of location related access of an item, and/or frequency of event related access of an item. The items may be displayed on a mobile device. The mobile device may include software that is pre-loaded with the device, installed from an app store, installed from a desktop computer, installed from media, or downloaded from a Web site. The mobile device may use an operating system selected from the group consisting of: iOS, Android OS, Windows Phone OS, Blackberry OS and mobile versions of Linux OS. Items may be stored using the OneNote® note-taking software provided by the Microsoft Corporation of Redmond, Wash.

According further to the system described herein, computer software, provided in a non-transitory computer-readable medium, provides a view of relevant items of a content collection. The software includes executable code that identifies a current context based on temporal parameters, spatial parameters, navigational parameters, lexical parameters, organizational parameters, and/or events, executable code that evaluates each of the items of the content collection according to the current context to provide a value for each of the items, and executable code that displays a subset of the items corresponding to highest determined values. The temporal parameters may include a time of recent access of an item, frequency of access of an item, frequency of location related access of an item, and frequency of event related access of an item. Frequency of access of an item may be modeled according to the following formula:

$$f^u(e) = \Sigma_{c_j \in C^e} 2^{-t(c_j)/t_m} / \Sigma_{c_j \in C} 2^{-t(c_j)/t_m}$$

where $f^u(.)$ is a feature value for frequency, e is an accessed content item, $c_i(c_j), C, C^e$ are, respectively, past user actions and a set of all actions and only past actions where the user has accessed the item e, $t(c_i)(t(C_j))$ is an age of each access event measured at a present moment, and $t_m$ is a normalizing median coefficient. Temporal patterns of accessing items may be numerically assessed based on time of day, time of week, and/or time of month. Executable code that evaluates each item may determine a distance from a separating hyperplane using a support vector machine classification method. User feedback may be used to adjust subsequent evaluation of each of the items. The user feedback may be implicit and may include frequency of actual viewing by the user. The user feedback may be explicit. User feedback may be used to modify features used to evaluate items. The subset of items may include only items having a value above a predetermined threshold and displaying the subset of items may include sorting the subset according to values provided for each of the items and items that are not part of the subset may be displayed following items in the subset. Executable code that displays the subset of items may display the items in a pop up screen that is superimposed over a different list containing the items. Executable code that analyzes items may split the items into a training set and a test set and may build a classifier using automatic learning. Prior to evaluating the items, the items in the training set may be analyzed to develop a set of rules used for evaluation of the items. The temporal parameters of the items in the training set may include a time of recent access of an item, frequency of access of an item, frequency of location related access of an item, and/or frequency of event related access of an item. The items may be displayed on a mobile device. The mobile device may include software that is pre-loaded with the device, installed from an app store, installed from a desktop computer, installed from media, or downloaded from a Web site. The mobile device may use an operating system selected from the group consisting of: iOS, Android OS, Windows Phone OS, Blackberry OS and mobile versions of Linux OS. Items may be stored using the OneNote® note-taking software provided by the Microsoft Corporation of Redmond, Wash.

The proposed system automatically generates preferred content views, re-grouping and selecting such content items as notes and notebooks depending on a particular environment or conditions, reflected in context related features, and based on automatic classification with parameters derived from historical patterns of user access to items.

At a first phase, extensive content collections from many existing users of a content management system are processed and analyzed to develop a set of learning features, or rules, derived from contexts (environment, situation, conditions) and defining stable repetitive viewing of content items (e.g., notes).

Such features may include and combine temporal, spatial, navigational, lexical, organizational and other parameters, events such as meetings, trips, visits, and other factors that may be pre-processed and formalized by the system, to reflect real life situations via linguistic variables in the meaning accepted in probability and fuzzy set theories. Thus, temporal features may include modeled notions of recent access, frequent access, frequent location related access, frequent event related access, etc. For example, a numeric feature value for frequent access may be modeled as:

$$f^u(e) = \Sigma_{c_j \in C^e} 2^{-t(c_j)/t_m} / \Sigma_{c_j \in C} 2^{-t(c_j)/t_m} \quad (1)$$

where $f^u(e)$ is a feature value for frequency (a superscript 'u.' reflects the term 'usualness'); e is an accessed content item, such as a note, a notebook or a tag;

$c_i(c_j), C, C^e$ are respectively, the past user actions and the set of all actions and only the past actions where the user has accessed the item e;

$t(c_i)(t(c_j))$ is an age of each access event measured at the present moment;

$t_m$ is a normalizing median coefficient; for example, if all time measurements are in seconds, $t_m$ may be equal to 2,592,000, which corresponds to a 30-day age of an item.

Analogously, by restricting sets of user note access actions to actions performed in a certain location $(C_l, C_l^e)$ corresponding to a certain navigational scheme $(C_n, C_n^e)$ or an event (incidence), such as a calendar meeting $(C_i, C_i^e)$ combined temporal and non-temporal features such as frequency+location, frequency+navigation, etc. can be modeled.

Furthermore, temporal patterns of accessing notes may also be numerically assessed. Examples are presented in the following list:

The time of day, measured in half hour intervals
The time of week, measured in half hour intervals
The time of month, measured in half hour intervals
The time of day, measured in four hour intervals
The time of week, measured in four hour intervals
The time of month, measured in four hour intervals
The day of week
The time of week, measured in twenty-four hour intervals
The time of month, measured in twenty-four hour intervals The following are examples of contexts and applications where the temporal, spatial, navigational and other features may be utilized:

View a certain note every time a user is at a given location. This rule has a broad set of applications, such as viewing partnerships related notes when a user arrives to a meeting at partner address and the system identifies user location, for example, from a mobile copy of content management software running on a user location aware device (GPS, GeoIP, etc.). Another application could be an automatic display of a note with an ATM pin number when a user arrives to a known ATM location where the note containing the pin number was frequently recalled in the past.

View a certain note at a given time if such note has been repetitively viewed at around the given time in the past. Applications could be Monday to-do lists for the week on Monday morning; meeting notes from a last week staff meeting; etc.

View a certain note in conjunction with a scheduled event, such as meetings, meeting reminders, action reminders, etc.

View a certain note if it previously appeared near the top of a saved search query and has been frequently viewed after such search has been performed.

View a certain note when meeting around the same periodically repeating time with certain people is detected by schedule and location aware technologies. Applications include opening master project schedule every time when all or part of a project team meets for weekly project reviews.

Based on a preliminary analysis of repetitive note viewing patterns, a set of features/rules may be chosen and numeric representations for the features may be defined, as explained elsewhere herein.

At a next phase, the conglomerate of pre-existing content collections may be split into a training set and a test set, and a binary classifier may be built and optimized using automatic learning.

The classifier may work with an input data pair (item, context) and may define whether the item may be added to a preferred viewing list for a given context; additionally, for items that are positively assessed by the classifier, the score of the items may be calculated, such as a distance from the separating hyperplane in the numeric feature space corresponding to the (linear or non-linear) Support Vector Machine (SVM) classification method. Ranking notes in the preferred viewing list by scores of the notes may allow control over a length of the list to address possible user interface and other requirements.

A version of a preferred note view classifier developed at the previous step may be bundled with the content management or note-taking software and may be delivered to new users and immediately employed for automatic building of custom preferred content views for various contexts. An explicit or implicit user feedback to the functioning of such classifier may be used to improve the system and adjust the classifier:

An implicit user feedback may be monitored by the system through measuring frequency of actual viewing by users of notes in the preferred lists An explicit user feedback may use a built-in feedback mechanism.

Both techniques may lead to re-training and adjusting parameters of the classifier, such as weights representing the coordinates of a normal vector in the SVM method. In some embodiments, user feedback may be used to modify the set of features through supervised learning.

From the user interface standpoint, preferred viewing lists may be implemented in a variety of ways. The preferred viewing lists may be displayed as separate lists of notes that automatically pop up on a user screen every time a new context is identified and requires an update of a preferred view. Alternatively, preferred view may populate a list or a section of a list of favorite user notes. In yet another implementation, preferred notes for a new context may be displayed in a top portion of a main note view preceding other notes, as if the preferred view implied a new sorting order pushing previously displayed top items down the list.

Preferred views may not be limited to individual notes and other elementary content units. Similar technique may be applied to choosing larger content assemblies, such as notebooks or notebook stacks in the Evernote content management system. The techniques may also be used to modify tags, lists of saved searches, lists of favorites and other content related displayable attributes that may depend on the environment, external conditions and contexts.

It should be noted that, while the system may constantly monitor changing conditions, the system may also have built-in thresholds to identify meaningful changes of the context and assess notes for the purpose of inclusion of particular notes into preferred views only when such meaningful changes occur. Such clustering of contexts may bring additional economy of system resources.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for building preferred views of items from individual, shared and organization-wide content collections in response to changing environment and context. Items may include individual notes, notebooks, tags, search lists and other attributes; contexts may include temporal characteristics, location, navigation, events, content organization and other features. The mechanism utilizes classifiers build through automatic learning based on past user access to content items; classifiers may be dynamically adjusted based on user feedback.

Figure 1:
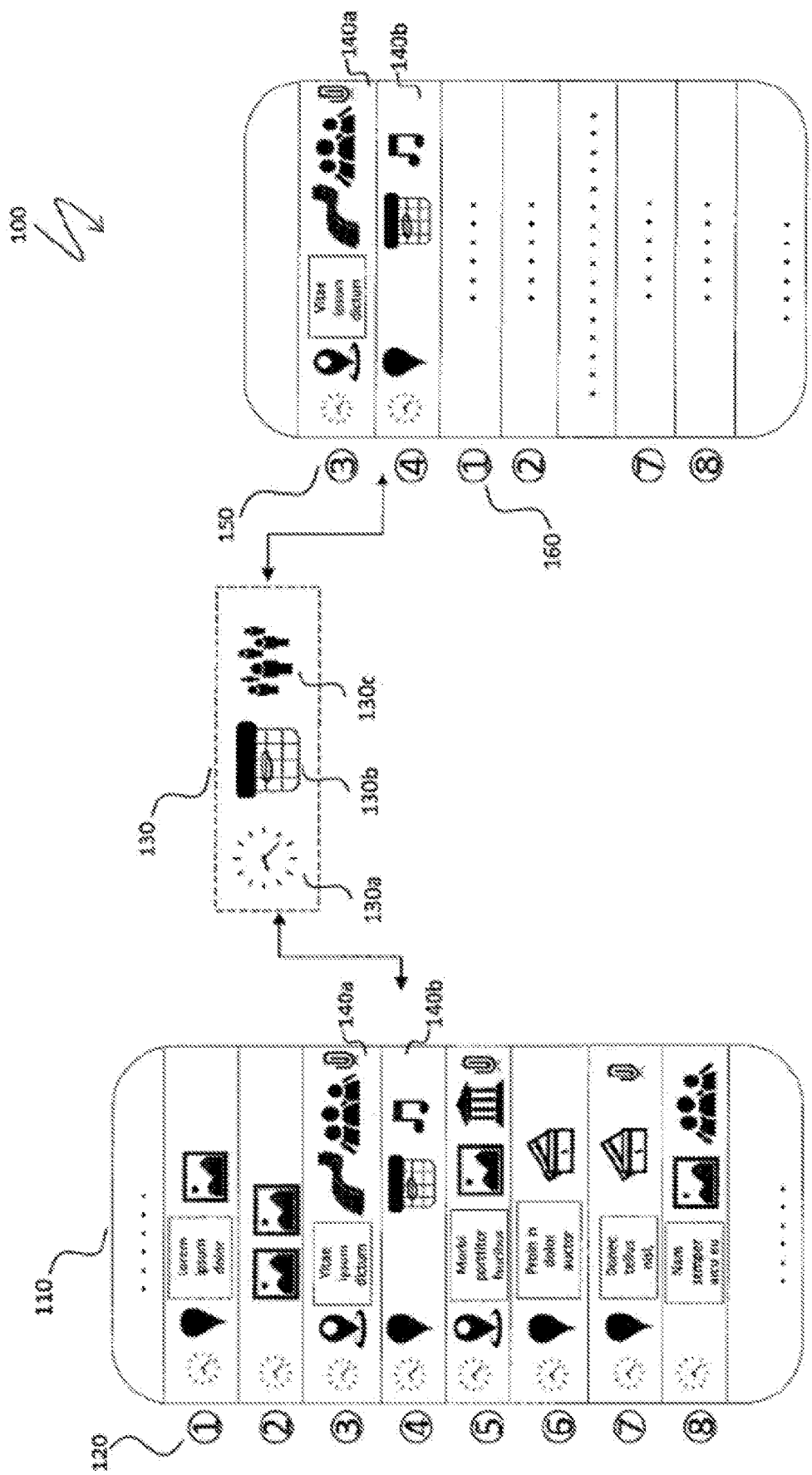
FIG. 1 is a schematic illustration of a preferred note view created in response to a temporal, scheduling and sharing context, according to an embodiment of to the system described herein.

FIG. 1 is a schematic illustration 100 showing a preferred note view created in response to a temporal, scheduling and sharing context. A content collection 110 displays eight notes 120 to a user. In response to a new context 130, that includes a temporal context 130a, a scheduling context 130b and a sharing context 130c, a system classifier applied to the content collection (not shown in FIG. 1, see FIG. 3 and the accompanying text for details) chooses two notes 140a, 140b for inclusion in a preferred system view. Subsequently, the notes in a previously displayed main note view are reordered so that the notes 140a, 140b occupy a top position 150 and a remainder of the notes 160 are pushed down the main view.

Figure 2:
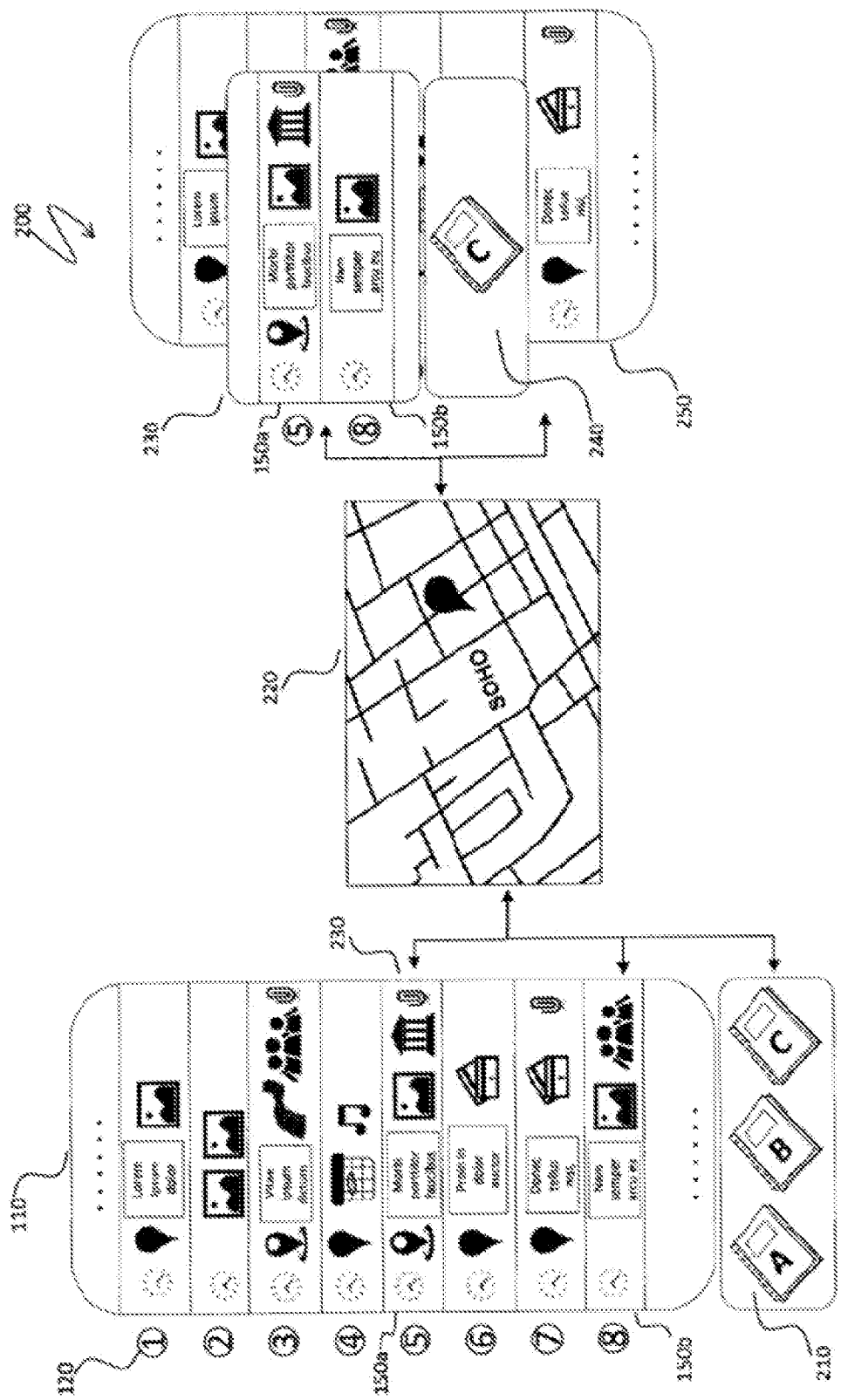
FIG. 2 is a schematic illustration of preferred note and notebooks views created in response to a geolocation context, according to an embodiment of the system described herein.

FIG. 2 is a schematic illustration 200 showing preferred note and notebooks views created in response to a geolocation context. Analogously to FIG. 1, a content collection 110 displays eight notes 120 to a user. Additionally, a notebook view of the content collections includes three notebooks 210 (notebooks A, B, C). In response to a new geolocation context 220, a system classifier applied to the content collection (not shown in FIG. 2) chooses two notes 150a, 150b and a notebook C for inclusion in a preferred system view. Subsequently, the two selected notes 150a, 150b are displayed in a pop-up pane 230; at a bottom portion 240 of the pane 230, the selected notebook is also displayed. FIG. 2 illustrates a different user interface solution compared with the FIG. 1: In FIG. 2, the pane 230 with a preferred note view is shown on top of a main note view 250.

Figure 3:
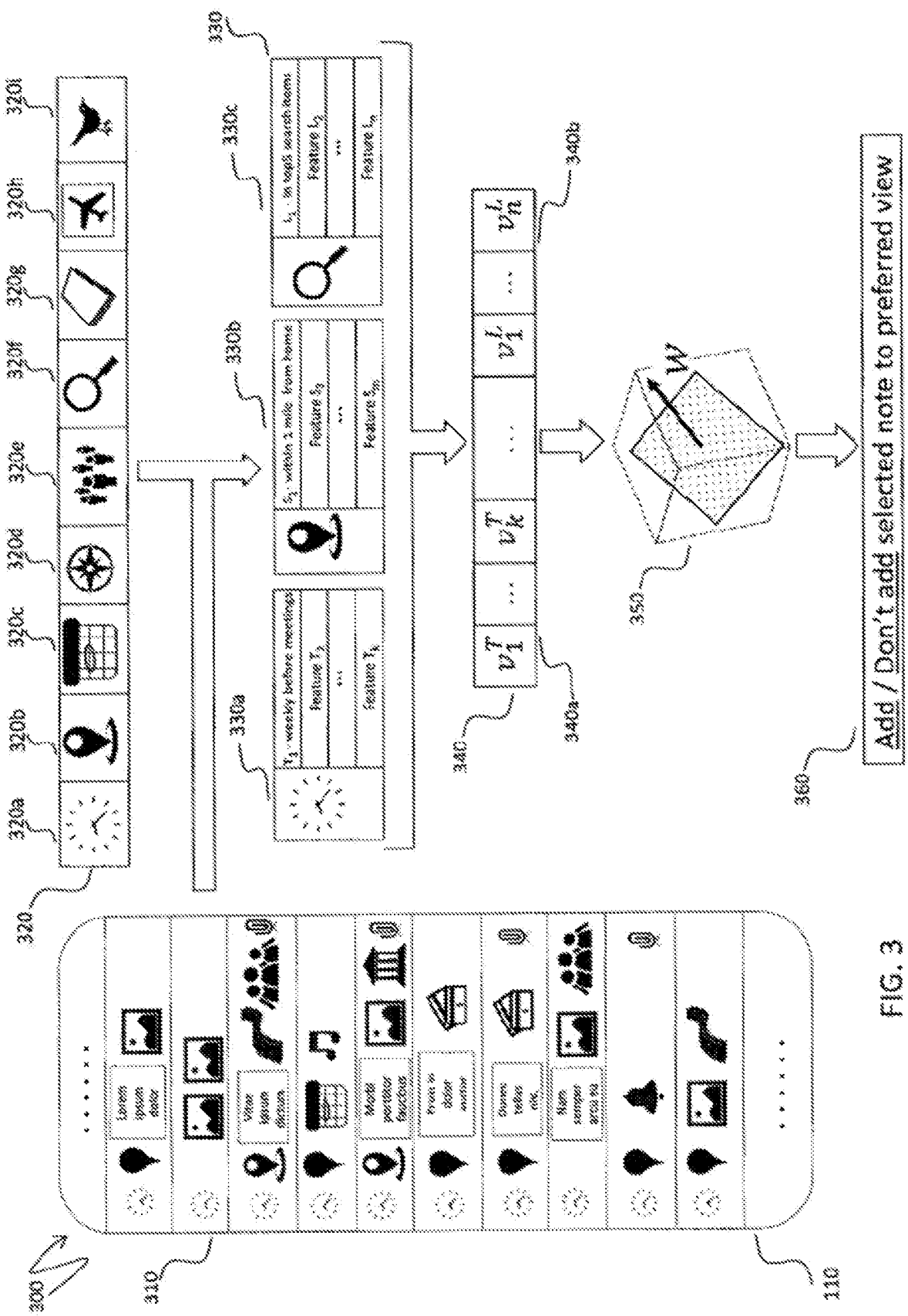
FIG. 3 is a schematic illustration of feature extraction from an individual note and classification of the note, according to an embodiment of the system described herein.

FIG. 3 is a schematic illustration 300 of feature extraction from an individual note and classification of the individual note. The note collection 110 is scanned by the system to identify notes that should be included in a preferred note view reflecting a current context 320. In the example of FIG. 3, a note 310 is evaluated based on the current context 320. The current context 320 may include multiple components, such as a temporal context 320a, a spatial (geolocation) context 320b, scheduled events 320c, a navigational context 320d (such as a scrolling view, a tag based view or a notebook based view within a content collection), a sharing context 320e, a search context 320f, a linguistic (textual) context 320g, a travel context 320h, a social network context 320i, etc.

Furthermore, each component of the context may be represented by one or multiple features 330. In the illustration 300, three sample feature sets 330a, 330b, 330c are shown and the first feature in each set is described in details:

The feature set 330a is a group of k features $T_1 \ldots T_k$ for a temporal context;

The feature set 330b is a group of m features $S_1 \ldots S_m$ for a spatial context;

The feature set 330c is a group of n features $L_1 \ldots L_n$ for a search context.

The system may extract attributes of the note 310 corresponding to each of the feature sets 330a-330c and build numeric feature values 340, as explained elsewhere herein (see, for example, formula (1) for some of the temporal features). Numeric feature values are illustrated in FIG. 1 for a temporal context—the feature set 340a, and for a search context the features set 340b.

At a next step, a vector V of feature values 340 is processed using a classifier 350, such as an SVM classifier where a separating plane defining one of two possible outcomes is defined by a normal vector W of the classifier plane, so the outcome is associated with a sign of the dot product V·W (for example, V·W>0 may indicate an inclusion of the note 310 into a preferred note view, as illustrated in FIGS. 1, 2). Based on the classification result, the system makes a binary decision 360 to add the selected note 310 to the preferred note view or to not add the note 310.

Figure 4:
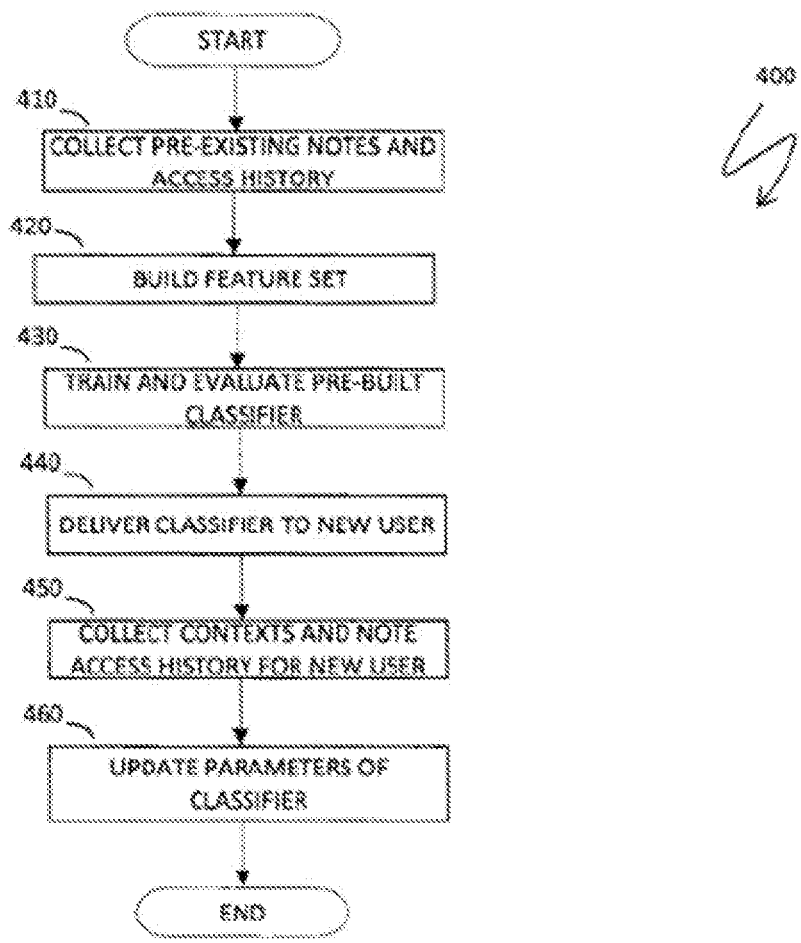
FIG. 4 is a system flow diagram illustrating automatic learning, according to an embodiment of the system described herein.

Referring to FIG. 4, a flow diagram illustrates automatic learning in conjunction with compiling an SVM classifier. Processing begins at a step 410 where pre-existing notes and access history are collected, as explained elsewhere herein. After the step 410, processing proceeds to a step 420 where a feature set for automatic learning is built. After the step 420, processing proceeds to a step 430 where a classifier designated for pre-building into the system and delivering to users is trained and evaluated utilizing training and test sets of notes (and possibly other items in content collections, such as notebooks, tags, search lists, etc.). After the step 430, processing proceeds to a step 440 where the classifier is delivered to a new user with the classifier software. After the step 440, processing proceeds to a step 450 where, in connection with software functioning and user access to notes and other items in different environments, the system collects additional contexts and note access history for the new user. After the step 450, processing proceeds to a step 460 where the classifier is re-trained and parameters of the classifier are modified. After the step 460, processing is complete.

Figure 5:
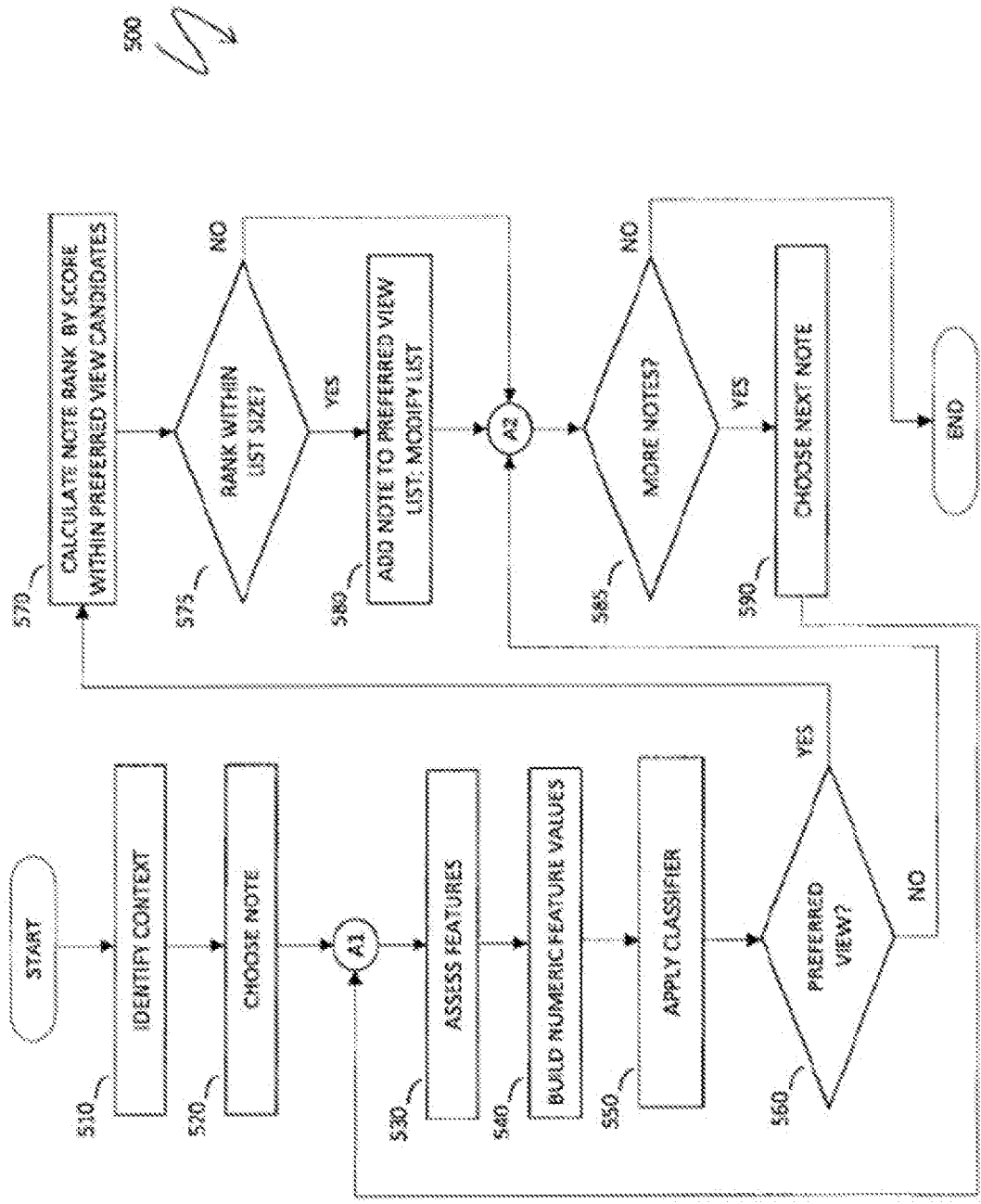
FIG. 5 is a system flow diagram describing building of preferred content views, according to an embodiment of the system described herein.

Referring to FIG. 5, a flow diagram 500 describes building preferred content views. Processing begins at a step 510 where the system identifies the current context, as described elsewhere herein. After the step 510, processing proceeds to a step 520 where a note or other item is chosen for evaluation. After the step 520, processing proceeds to a step 530 where features relevant to the current context and the chosen note are assessed, as described in more detail elsewhere herein. After the step 530, processing proceeds to a step 540 where numeric feature values for the selected note and the current context are built, as explained elsewhere herein (see, for example, formula (1) and FIG. 3).

After the step 540, processing proceeds to a step 550 where the classifier is applied to a vector of numeric feature values (see, for example, items 340, 350 and the accompanying text in FIG. 3). After the step 550, processing proceeds to a test step 560 where it is determined whether the previous step resulted in assigning the selected note to the preferred view. If so, processing proceeds to a step 570 where the note score obtained during the classification step (such as a cosine of the angle between the vectors V, W explained in conjunction with FIG. 3) is used to calculate note rank with respect to other notes identified as candidates for inclusion in the preferred view (if any). Such ranking may apply to any type of items that may be present in the preferred view: notes, notebooks, tags, saved search queries, etc.

After the step 570, processing proceeds to a test step 575 where it is determined whether the note rank is within a preferred list size. If so, processing proceeds to a step 580 where the note is added to the preferred view list and the list is modified if necessary; for example, a previously included item with a lower score residing at the bottom of the list may be eliminated from the preferred view list. After the step 580, processing proceeds to a test step 585 where it is determined whether there are more notes to evaluate. Note that the step 585 may be independently reached from the step 560 if the selected note is not added to the preferred view and from the step 575 if the note rank is outside the list size. If there are more notes to evaluate, processing proceeds to a step 590 where the next note is chosen and control is transferred back to the step 530; otherwise, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. A mobile device, such as a cell phone or a tablet, may be used to implement the system described herein, although other devices, such as a laptop computer, etc., are also possible. The mobile device may include software that is pre-loaded with the device, installed from an app store, installed from a desktop (after possibly being pre-loaded thereon), installed from media such as a CD, DVD, etc., and/or downloaded from a Web site. The mobile device may use an operating system selected from the group consisting of: iOS, Android OS, Windows Phone OS, Blackberry OS and mobile versions of Linux OS. The items may be stored using the OneNote® note-taking software provided by the Microsoft Corporation of Redmond, Wash.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method performed at a computer system communicatively connected with a mobile device associated with a user, the computer system including one or more processors and memory storing programs for execution by the one or more processors, the method comprising:
    obtaining access to a content collection of the user, wherein the content collection includes a plurality of content items having a plurality of content types;
    for each of the content items from the content collection:
        determining user access history for the content item; and
        determining context associated with the user access history;
    building a classifier characterizing a user access pattern of the content items based on the access history and the context associated with the user history;
    constantly monitoring in real-time environmental parameters of the user, including constantly monitoring changing conditions to identify changing environmental parameters of the user;
    inferring a current context of the user based on the environmental parameters;
    in accordance with the current context, for each of the content items:
        extracting numeric feature values to generate a vector of feature values;
        evaluating the content item using the classifier; and
        determining a score for the content item based on the vector of feature values, the score indicating a likelihood of user access of the content item in the current context;
    identifying in real-time a subset of content items in the content collection that is most relevant to the current context based on the determined score, wherein the subset is a partial aggregation of the collection of content items having highest scores;
    generating a preferred view of the subset; and
    causing to be delivered to and displayed on the mobile device the preferred view and a list of favorite user notes, wherein the preferred view populates a section of the list of favorite user notes, wherein:
        the content collection is displayed as a list on the mobile device; and
        generating the preferred view of the subset includes reordering the list such that the subset of content items in the content collection are displayed on top of the list.

2. The method of claim 1, wherein the plurality of content types includes:
    documents, user notes, notebooks, search lists, media files, appointments, navigational routes, and reminders.

3. The method of claim 1, wherein:
    the context associated with the user access history and the current context include a plurality of components; and
    each of the components has a respective set of distinct features that is used to evaluate relevance of the content items in the content collection.

4. The method of claim 3, wherein inferring the current context of the user further comprises comparing the respective set of features of each of the components in the context associated with the user access history and the current context.

5. The method of claim 3, wherein the plurality of components includes a plurality of: temporal, geolocation, scheduled events, navigational, organizational, sharing context, search, travel, and social network.

6. The method of claim 3, further comprising modifying an associated set of features of at least one of the components based on user feedback.

7. The method of claim 1, wherein:
the context associated with the user access history includes a temporal context; and
the temporal context includes one or more temporal patterns of access of an item selected from: a time of recent access of an item, frequency of access of an item, frequency of location related access of an item, and frequency of event related access of an item.

8. The method of claim 7, wherein the one or more temporal patterns of access of the item are numerically assessed based on at least one of: time of day, time of week, and time of month.

9. A computer system communicatively connected with a mobile device associated with a user, the computer system comprising:
one or more processors; and
memory storing one or more programs to be executed by the one or more processors, the one or more programs comprising instructions for:
obtaining access to a content collection of the user, wherein the content collection includes a plurality of content items having a plurality of content types;
for each of the content items from the content collection:
determining user access history for the content item; and
determining context associated with the user access history;
building a classifier characterizing a user access pattern of the content items based on the access history and the context associated with the user history;
constantly monitoring in real-time environmental parameters of the user, including constantly monitoring changing conditions to identify changing environmental parameters of the user;
inferring a current context of the user based on the environmental parameters;
in accordance with the current context, for each of the content items:
extracting numeric feature values to generate a vector of feature values;
evaluating the content item using the classifier; and
determining a score for the content item based on the vector of feature values, the score indicating a likelihood of user access of the content item in the current context;
identifying in real-time a subset of content items in the content collection that is most relevant to the current context based on the determined score, wherein the subset is a partial aggregation of the collection of content items having highest scores;
generating a preferred view of the subset; and
causing to be delivered to and displayed on the mobile device the preferred view and a list of favorite user notes, wherein the preferred view populates a section of the list of favorite user notes, wherein:
the content collection is displayed as a list on the mobile device; and
the instructions for generating the preferred view of the subset include instructions for reordering the list such that the subset of content items in the content collection are displayed on top of the list.

10. The computer system of claim 9, wherein:
the subset of content items in the content collection includes only content items having a relevance value above a predetermined threshold; and
the instructions for generating the preferred view of the subset and causing to be delivered to the mobile device for display on the mobile device the preferred view further comprise instructions for:
sorting the subset according to respective relevance values of the content items in the subset, and wherein content items that are not part of the subset are displayed following the content items in the subset.

11. The computer system of claim 9, the one or more programs further comprising instructions for:
splitting the content items into a training set and a test set; and
analyzing the content items in the training set to develop a set of rules used for evaluation of relevance of the content items,
wherein the instructions for building the classifier further include instructions for performing automatic learning on the training set.

12. The computer system of claim 9, wherein:
the classifier comprises a support vector machine classification method; and
the instructions for determining the score for the content item based on the vector of feature values include instructions for determining the score based on a relationship between the vector of feature values and a normal vector of a separating hyperplane using the support vector machine classification method.

13. A non-transitory computer-readable storage medium storing one or more programs for execution by one or more processors of a computer system that is communicatively connected with a mobile device associated with a user, the one or more programs comprising instructions for:
obtaining access to a content collection of the user, wherein the content collection includes a plurality of content items having a plurality of content types;
for each of the content items from the content collection:
determining user access history for the content item; and
determining context associated with the user access history;
building a classifier characterizing a user access pattern of the content items based on the access history and the context associated with the user history;
constantly monitoring in real-time environmental parameters of the user, including constantly monitoring changing conditions to identify changing environmental parameters of the user;
inferring a current context of the user based on the environmental parameters;
in accordance with the current context, for each of the content items:
extracting numeric feature values to generate a vector of feature values;
evaluating the content item using the classifier; and
determining a score for the content item based on the vector of feature values, the score indicating a likelihood of user access of the content item in the current context;
identifying in real-time a subset of content items in the content collection that is most relevant to the current context based on the determined score, wherein the subset is a partial aggregation of the collection of content items having highest scores;
generating a preferred view of the subset; and
causing to be delivered to and displayed on the mobile device the preferred view and a list of favorite user notes, wherein the preferred view populates a section of the list of favorite user notes, wherein:
   the content collection is displayed as a list on the mobile device; and
   the instructions for generating the preferred view of the subset include instructions for reordering the list such that the subset of content items in the content collection are displayed on top of the list.

14. The non-transitory computer-readable storage medium of claim 13, the one or more programs further comprising instructions for adjusting subsequent subsets of the collection of content items based on user feedback.

15. The non-transitory computer-readable storage medium of claim 14, wherein the user feedback is implicit and includes frequency of actual viewing of respective items of the collection of the content items by the user.

16. The non-transitory computer-readable storage medium of claim 14, wherein the user feedback is explicit.

17. The non-transitory computer-readable storage medium of claim 13, wherein the instructions for causing to be delivered to the mobile device for display at the mobile device the preferred view include instructions for causing to be displayed on the mobile device:
   a first view including the content collection; and
   the preferred view, wherein the preferred view is configured for presentation separately from the first view based on a ranking of the content items in the subset the scores.

18. The non-transitory computer-readable storage medium of claim 17, wherein the preferred view includes a pop up screen that is superimposed over the first view.

* * * * *